US008787233B2

(12) United States Patent
Fox

(10) Patent No.: US 8,787,233 B2
(45) Date of Patent: Jul. 22, 2014

(54) TELECOMMUNICATIONS NETWORKS

(75) Inventor: David Fox, Reading (GB)

(73) Assignee: Vodafone Group PLC, Newbury, Berkshire (GB)

( * ) Notice: Subject to any disclaimer, the term of this patent is extended or adjusted under 35 U.S.C. 154(b) by 1455 days.

(21) Appl. No.: 12/225,969

(22) PCT Filed: Feb. 9, 2007

(86) PCT No.: PCT/GB2007/000470
§ 371 (c)(1),
(2), (4) Date: Jan. 12, 2009

(87) PCT Pub. No.: WO2007/113457
PCT Pub. Date: Oct. 11, 2007

(65) Prior Publication Data
US 2010/0048168 A1 Feb. 25, 2010

(30) Foreign Application Priority Data

Apr. 3, 2006 (GB) .................................. 0606692.2

(51) Int. Cl.
*H04H 20/71* (2008.01)
(52) U.S. Cl.
USPC ............................ 370/312; 455/410; 455/466
(58) Field of Classification Search
USPC ...................... 370/320; 455/432.1, 434, 435.2
See application file for complete search history.

(56) References Cited

U.S. PATENT DOCUMENTS

| 6,628,946 B1* | 9/2003 | Wiberg et al. ................. 455/434 |
| 2004/0002342 A1* | 1/2004 | Goldberg et al. ............. 455/455 |
| 2008/0182594 A1* | 7/2008 | Flore et al. .................... 455/458 |
| 2008/0188219 A1* | 8/2008 | Fischer .......................... 455/434 |
| 2009/0252119 A1* | 10/2009 | Fischer et al. ................. 370/331 |
| 2010/0167750 A1* | 7/2010 | Lee et al. ...................... 455/450 |

FOREIGN PATENT DOCUMENTS

| WO | WO 00/36853 | 6/2000 |
| WO | WO 00/72609 A1 | 11/2000 |

OTHER PUBLICATIONS

"3rd Generation Partnership Project; Technical Specification Group Radio Access Network; Radio Resource Control (RRC); Protocol Specification (Release 6)" 3GPP TS 25.331 V6.8.0, Dec. 2005, XP002433615, p. 44-71.
3GPP TS 23.236 V6.3.0 (Mar. 2006), Technical Specification, 3rd Generation Partnership Project; Technical Specification Group Services and System Aspects; Intra-domain connection of Radio Access Network (RAN) nodes to multiple Core Network (CN) nodes (Release 6), 37 pp.

* cited by examiner

*Primary Examiner* — Donald Mills
*Assistant Examiner* — Henry Baron
(74) *Attorney, Agent, or Firm* — Muirhead and Saturnelli, LLC

(57) ABSTRACT

Providing a mobile terminal with system information which enables the terminal to access one of the cells of a cellular telecommunications system includes transmitting from the telecommunications system to all terminals within the cell, including the terminal, a system information indicator that makes available to the terminal system information to provide access to the system. The system information indicator is transmitted on the broadcast channel (BCH). The system information indicator may be a sub-set of the system information conventionally transmitted on the BCH but which is sufficient to allow the mobile terminal to access the network and obtain in the downlink further system information. Alternatively, the information transmitted in the BCH may be a profile index value which directs the mobile terminal to retrieve from a store of the mobile terminal system information pre-stored on the mobile terminal.

33 Claims, 4 Drawing Sheets

TELECOMMUNICATIONS NETWORKS

TECHNICAL FIELD

This application relates to a method of providing a terminal with system information which enables the terminal to access one of the cells of a cellular system, and to a telecommunications system for implementing this method.

BACKGROUND TO THE INVENTION 2G (GSM) and 3G (UMTS/UTRA) mobile telecommunications networks have a radio interface in which user data and signalling may be sent either on a dedicated channel (DCH) allocated to a particular mobile terminal (for a given service offered to the mobile terminal) or on a common channel. Common channels include the random access channel (RACH), forward link access channel (FACH), broadcast channel (BCH) and the paging channel (PCH).

The RACH is used only in the uplink direction. Because the RACH is not reserved, there is a risk that multiple mobile terminals will use it simultaneously so that a "collision" occurs on the radio path and data cannot be successfully received by the network. When using the RACH, an identifier of the mobile terminal originating the transfer is sent.

Burst transmission power on the RACH is determined using open loop power control. Prior to the transmission of a random access burst, the mobile terminal measures the received power on the downlink primary control physical channel (CCPCH). Additionally, the network informs the mobile terminal on the BCH channel about the transmission power of the CCPCH channel. In addition to these data, the transmission power determination uses the uplink interface level information as well as information about the required signal-to-interference ratio (SIR), which are sent to the mobile terminal on the BCH.

A downlink BCH uses a fixed transfer rate. The BCH is used to pass parameters and system information about, and the capabilities of, the current cell in which a mobile terminal is located, and also information about, and the capabilities of, the overall telecommunications system/network.

The BCH parameters and system information may include:

BCH Configuration information—The BCH is split into at least two parts, with the configuration of the second part transmitted in the first part; however the configuration may be common for the whole frequency band.

RACH Configuration information—The system information provides a configuration of the RACH in terms of its location/occurrence in frequency/time/code domains, as well as the maximum transmit power of the UE, and the maximum number of access attempts.

PCH Configuration information—The system information provides a configuration of the PCH in terms of its location/occurrence in frequency/time domains for each paging group. The mobile terminals are split into a number of paging groups.

Measurement Control information—Information is provided by the eNodeB to control the accuracy (frequency/averaging period) which the UE has to meet when measuring the cells of the serving or neighbouring eNodeBs.

Mobility Control information—Information passed to the mobile terminal to control idle mode mobility, including the timer values (e.g. periodic tracking area timer, hysteresis for specific frequency bands, hysteresis for Tracking Area boundaries, hysteresis for cell change, hysteresis for inter RAT change, cell-reselection failure timers).

The quantity and periodicity of the BCH is critical for various reasons, including the following reasons.

Firstly, the BCH has to be successfully received with a high probability over the whole coverage area of the cell. There are no specific retransmissions to individual mobile terminals. Therefore, a mobile terminal that does not successfully receive the BCH is not provided with coverage by the cell.

Secondly, for a mobile terminal in the idle or inactive state, the periodicity of the BCH determines how long the mobile terminal will be out of service after having performed cell reselection. The newly selected cell cannot provide coverage until the full set of system information transmitted in the BCH is received by the mobile terminal.

Thirdly, the quantity and periodicity of the BCH will determine the bandwidth required for the BCH transmission. The higher the quantity of the BCH data and the more frequently that it is transmitted requires increased bandwidth and reduces the efficiency of the radio network (that is, a higher proportion of the available bandwidth is used for BCH transmissions, rather than other transmissions).

In known telecommunications systems information transmitted in the BCH includes nearly all the information that enables the mobile terminal to access the relevant cell and provide knowledge of the radio features supported by the cell. To transmit this information, a significant quantity of data must be transmitted at regular intervals on the BCH, consuming radio resources that could otherwise be used for other purposes. Much of the system information for different cells of a particular PLMN is likely to be similar, with a small number of parameter combinations varying from cell to cell.

Also, in known telecommunications systems, due to the nature of the BCH, the same system data are received by all terminals in the same cell. Further, when a mobile terminal is in the active state, in connected mode, and "handover" occurs as the terminal moves from one cell to another, the system information may be received in the Handover Signalling, so the system information transmitted in BCH of the new cell is redundant.

Accordingly, it would be desirable to provide an improved arrangement where the quantity of data transmitted in the BCH is reduced and to provide an arrangement that allows the system information to be different for each mobile terminal in a cell.

A development of 3G mobile telecommunications is "evolved" UTRA or E-UTRA, also referred to as SAE (System Architecture Evolution)/LTE (Long Term Evolution). LTE telecommunications will also use a BCH of a similar type to that used in 3G. The system described herein is applicable to many types of radio access networks (RANs) including 2G, 3G and LTE.

SUMMARY OF THE INVENTION

According to the system described herein, a method of providing a terminal with system information which enables the terminal to access one of the cells of a cellular telecommunications system includes transmitting from the system to all terminals in said cell, including said terminal, a system information indicator that makes available to the terminal system information to provide access to the system.

In the embodiments to be described in detail the system information indicator alone is insufficient to enable the mobile to (fully) access the telecommunications system. However, in the embodiments, the system information indicator does make available to the mobile terminal system information that may be equivalent to the system information that conventionally is transmitted on the BCH.

In the embodiments the system information indicator is broadcast by the cell on the BCH. Because the system information indicator contains less data than the system information conventionally transmitted on the BCH, the amount of data transmitted in the BCH according to the embodiments of the invention is much reduced compared to the prior art. Therefore, even if the periodicity (frequency) with which the BCH is transmitted is maintained, in the embodiments of the invention, the bandwidth required to transmit the BCH data to all mobile terminals in the cell is significantly reduced, thereby freeing up radio capacity for other purposes.

In the prior art arrangement, all mobile terminals in a particular cell, routing area, tracking area or telecommunications system are generally provided with the same system information on the BCH. Advantageously, the embodiments may provide mobile terminals in a particular cell, routing area or tracking area (or equivalent paging area) with different system information. Further, the system information made available to each mobile terminal within a particular cell may be different. The system information may be tailored to a particular mobile terminal's functionality, or to optimise use of the radio access network—for example, by controlling the use of a particular frequency band, by controlling frequency reselection, to push a mobile terminal for one particular type of radio access technology to another (for example, from 2G to 3G) or to cause a mobile terminal to reselect from a congested cell to a less congested cell.

In the first and second embodiments of the system described herein, the system information indicator enables (only) limited access of the mobile terminal to the telecommunications system. This limited access includes enabling the mobile terminal to request and receive from the telecommunications system a downlink message. In these embodiments the system information indicator is a system information minimum set that provides sufficient data to the mobile terminal to access the RACH and be granted resources from the base station of the cell. When the mobile terminal attaches to the mobility management entity (MME) of the cell or performs a paging area update, a message, for example a non-access stratum (NAS) message, received by the mobile terminal from the mobility management entity may include a system information indicator which provides the mobile terminal with the (additional) system information (that is, the system information required in addition to the system information indicator) to access the cell and make full use of the communication facilities offered by the cell. After receipt of the system information in the system information container, the mobile terminal has system information corresponding to that transmitted entirely in the BCH in the prior art.

In the third and fourth embodiments to be described, the system information indicator directs the mobile terminal to retrieve the system information from a store and use the system information to access the telecommunications system. This store is a store on the mobile terminal which stores a plurality of respective system informations. The system information indicator received on the BCH directs the mobile terminal to retrieve and use a particular one of the stored system informations. It is not necessary, therefore, for the system informations to be transmitted by the telecommunication system to the mobile terminal. However, these systems informations can be transmitted by the telecommunications system when desired—for example, in order to update the system informations. Generally, however, this updating will not be performed using the BCH. The system informations stored on the mobile terminal may be pre-stored thereon when the mobile terminal is manufactured.

According further to the system described herein, a method of transferring information from a cellular telecommunications network to a mobile terminal includes sending a network initiated transmission from the network to the mobile terminal, the network initiated transmission containing sufficient information to allow the mobile terminal to access a channel provided by a cell in which the mobile terminal is located, but insufficient information to enable the mobile terminal to use a service provided via the channel which service the mobile terminal is authorised to use, and, when the mobile terminal accesses the channel, the network providing the mobile terminal with further information enabling the mobile terminal to use the service.

The network initiated transmission may include a code (or index number) which identifies a set of information, and wherein during said accessing of the channel by the mobile terminal, the mobile terminal transmits the code to the network and the network transmits the set of information identified by the code to the mobile terminal, the set of information enabling the mobile terminal to use a package of services which the mobile terminal is authorised to use.

The network may store a plurality of different sets of information corresponding respectively to a plurality of different packages of services, each set of information being identified by a respective code.

According further to the system described herein, a cellular telecommunications network includes a memory for storing a plurality of different sets of information corresponding, respectively, to a plurality of different packages of services, each set of information being identified by a respective code (or index number); a transmitter for transmitting to each one of a plurality of mobile terminals (UEs) information allowing said each mobile terminal to access the network and one of said codes corresponding to a package of services which said each mobile terminal is authorised to use.

When a mobile terminal accesses a cell of the network after entering the cell, the mobile terminal may transmit its code to the network and the network returns the corresponding set of information to the mobile terminal, the set of information enabling the mobile terminal to access the package of services which the mobile terminal is authorised to use.

According further to the system described herein, a method of transferring data between a telecommunications network and a mobile terminal includes sending a first message from the network to the mobile terminal when the terminal enters a new tracking area; and sending a further message from the network to the mobile terminal, said further message containing information about the network which is essential in order for the mobile terminal to use a network service.

The first message may contain information about the new tracking area. The first message may comprise an index. The content of the further message may be operator configurable. The further message may contain only a sub-set of information about the new tracking area. The further message may be sent when the mobile terminal accesses the network. The first message contains information allowing the mobile terminal to access the network.

According further to the system described herein, a system includes a telecommunications network and a mobile terminal, wherein said telecommunications network comprises means for sending a first message to the mobile terminal when said mobile device enters a new tracking area; and means for sending further messages to the mobile terminal, and messages containing information about the system.

BRIEF DESCRIPTION OF THE DRAWINGS

Embodiments of the system described herein will now be explained by way of example, with reference to the accompanying drawings, in which.

In the drawings like elements are generally designated with the same reference sign.

DETAILED DESRIPTION OF VARIOUS EMBODIMENTS

Figure 1:
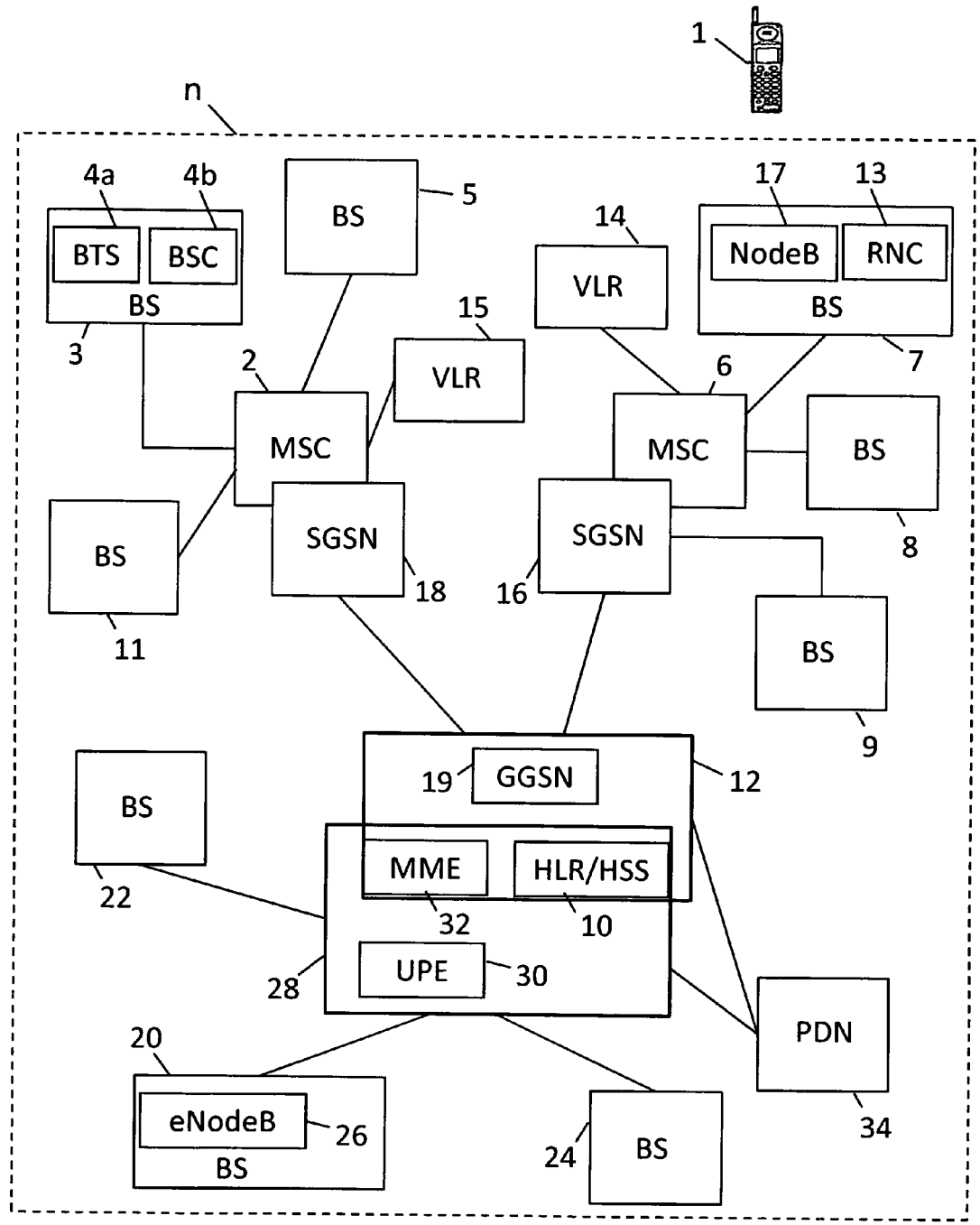
FIG. 1 is a diagrammatic drawing of certain elements of a mobile telecommunications network for use in explaining the operation of such a network.

Certain elements of a mobile telecommunications network, and its operation, will now briefly be described with reference to FIG. 1.

Each base station (BS) corresponds to a respective cell of its cellular or mobile telecommunications system or network (n) and receives calls/data from and transmits calls/data to a mobile terminal in that cell by wireless radio communication in one or both of the circuit switched (CS) or packet switched (PS) domains. Such a subscriber's mobile terminal (or User Equipment-UE) is shown at 1. The mobile terminal may be a handheld mobile telephone, a personal digital assistance (PDA), a laptop computer equipped with a datacard, or a laptop computer with an embedded chipset containing the UE's functionality.

In a GSM (2G) mobile telecommunications network, each base station subsystem 3 comprises a base transceiver station (BTS) 4a and a base station controller (BSC) 4b. A BSC may control more than one BTS. The BTSs and BSCs comprise the radio access network.

In a UMTS (3G) mobile telecommunications network, a radio network controller (RNC) 13 may control more than one node B 17. The node B's and RNC's comprise the radio access network.

Conventionally, the base stations are arranged in groups and each group of base stations is controlled by one mobile switching centre (MSC), such as MSC 2 for base stations 3, 11 and 5. As shown in FIG. 1, the network has another MSC 6, which is controlling a further three base stations 7, 8 and 9. In practice, the network will incorporate many more MSCs and base stations than shown in FIG. 1.

Each subscriber to the network is provided with a smart card or SIM which, when associated with the user's mobile terminal identifies the subscriber to the network. The SIM card is pre-programmed with a unique identification number, the "International Mobile Subscriber Identity" (IMSI) which is not visible on the card and is not known to the subscriber. The subscriber is issued with a publicly known number, that is, the subscriber's telephone number, by means of which calls to the subscriber are initiated by callers. This number is the MSISDN.

The network includes a home location register (HLR)/home subscriber server (HSS) 10 which, for each subscriber to the network, stores the IMSI and the corresponding MSISDN together with other subscriber data, such as the current or last known location of the subscriber's mobile terminal. The HSS is the master database for the network, and while logically it is viewed as one entity, in practice it will be made up of several physical databases. The HSS holds variables and identities for the support, establishment and maintenance of calls and sessions made by subscribers. As well as the basic HLR/authentication functions, the HSS may be enhanced through the use of additional databases and reference points. This enables the network to offer the subscriber advanced services and features by interfacing with service application servers based on CAMEL, OSA (Open Service Access) and SIP.

When the subscriber wishes to activate their mobile terminal in a network (so that it may make or receive calls subsequently), the subscriber places their SIM card in a card reader associated with the mobile terminal (terminal 1 in this example). The mobile terminal 1 then transmits the IMSI (read from the card) to the base station 7 associated with the particular cell in which the terminal 1 is located. In a traditional network, the base station 7 then transmits this IMSI to the MSC 6 with which the BS 7 is registered. In a network using the functionality described in 3GPP TS 23.236, the base station follows prescribed rules to select which MSC to use, and then transmits this IMSI to the selected MSC.

MSC 6 now accesses the appropriate location in the HLR/HSS 10 present in the network core (CN) 12 and extracts the corresponding subscriber MSISDN and other subscriber data from the appropriate storage location, and stores it temporarily in a location in a visitor location register (VLR) 14. In this way, therefore the particular subscriber is effectively registered with a particular MSC (MSC 6), and the subscriber's information is temporarily stored in the VLR (VLR 14) associated with that MSC. The information stored on the VLR 14 includes a Temporary Mobile Subscriber Identification (TMSI) number for identification purposes for the terminal within the MSC 6. The TMSI number is an identification number that is typically 32 bits in length. In conventional systems, therefore, the TMSI number is not allocated to more than one user of a given system served by that MSC at one time. Consequently, the TMSI number is usually invalidated when the mobile station crosses into a new location served by a different MSC.

When the HLR 10 is interrogated by the MSC 6 in the manner described above, the HLR 10 additionally performs an authentication procedure for the mobile terminal 1. The HLR 10 transmits authentication data to the MSC 6 in "challenge" and "response" forms. Using this data, MSC 6 passes a "challenge" to the mobile terminal 1 through base station 7. Upon receipt of this data, the mobile terminal 1 passes this data to its SIM and produces a "response". This response is generated using an encryption algorithm on the SIM and a unique Ki on the SIM. The response is transmitted back to the MSC 6 which checks it against its own information for the subscriber which checks it against information that it has obtained for that subscriber from the HLR 10 in order to complete the authentication process. If the response from the mobile terminal 1 is as expected, the mobile terminal 1 is deemed authenticated. At this point the MSC 6 requests subscription data from the HLR 10. The HLR 10 then passes the subscription data to the VLR 14.

The authentication process will be repeated at regular intervals while the mobile terminal 1 remains activated and can also be repeated each time the mobile terminal makes or receives a call, if required.

Each of the MSCs of the network (MSC 6 and MSC 2) has a respective VLR (14 and 15) associated with it and operates in the same way as already described when a subscriber activates a mobile terminal in one of the cells corresponding to one of the base stations controlled by that MSC.

When the subscriber using mobile terminal 1 wishes to make a call, having already inserted the SIM card into the reader associated with this mobile terminal and the SIM has been authenticated in the manner described, a call may be made by entering the telephone number of the called party in the usual way. This information is received by the base station 3 and passed on to the MSC 6. The MSC 6 routes the calls towards the called party via the MSC 6. By means of the information held in the VLR 14, MSC 6 can associate the call with a particular subscriber and thus record information for charging purposes.

The MSCs 6 and 2 support communications in the circuit switched domain—typically voice calls. Corresponding SGSNs 16 and 18 are provided to support communications in the packet switched domain—such as GPRS data transmissions. The SGSNs 16 and 18 function in an analogous way to the MSCs 6 and 2. The SGSNs 16, 18 are equipped with an equivalent to the VLR for the packet switched domain. GGSN 19 provides IP connectivity for the CN 12.

From the description above, it will be understood that the coverage area of a mobile telecommunications network is divided into a plurality of cells, each of which is served by a respective base station.

When a mobile terminal is in an active state, in order to allow the mobile terminal to maintain a call when the mobile terminal moves outside the coverage area of a cell, the call must be switched to an alternative cell automatically. The call must be routed to the new cell before handover can be effected whilst maintaining the connection with the old cell until the new connection is known to have succeeded. Handover is a time critical process requiring action to be taken before the radio link with the original cell degrades to such an extent that the call is lost. Handover requires synchronisation of events between the mobile terminal and the network.

When a mobile terminal is in an inactive or idle state, when a calling party (whether a subscriber within the mobile telecommunications network or outside it) attempts to call a mobile terminal within the network, that mobile terminal must be paged. Paging is a process of broadcasting a message which alerts a specific mobile terminal to take some action—in this example, to notify the terminal that there is an incoming call to be received. If the network knows in which cell the mobile terminal is located, it is only necessary to page in that cell. However, if the mobile terminal is moving within the network, the precise cell in which the mobile terminal is located may not be known. It will therefore be necessary to perform paging in a number of cells. The greater the number of cells in which paging must occur, the more use of valuable signalling capacity within the network.

However, if the HLR is to always have an up-to-date record of the cell in which each mobile terminal is located so that the current cell which is occupied by a terminal is always known, this will require a large amount of location updating signalling between the mobile terminal and the HLR in order that the HLR has up-to-date records of the cells occupied by each mobile terminal. This is also wasteful of valuable signalling capacity.

As indicated above, the HLR is updated each time a mobile terminal moves from the coverage area of one MSC to another MSC and from one SGSN to another SGSN. However, typically the area covered by a single MSC and SGSN is large, and to page all the cells covered by a single MSC and SGSN would require a significant amount of paging signalling.

The problems of excessive use of signalling capacity by paging a multiplicity of cells or performing a multiplicity of frequent location updates is solved in a known manner in 2G and 3G networks by dividing the coverage area of the mobile telecommunications network into a plurality of paging area, referred t as location areas (LAs) and into a plurality of routing areas (RAs).

A location area relates to a particular geographical area for communications in the circuit-switched domain. Typically, although not necessarily, a location area is larger than the area of a single cell but is smaller than the area covered by one MSC. Each cell within the network broadcasts data indicative of the identity of its location area (LAI). The mobile terminal uses this data to determine when it has moved into a new location area. The terminal stores its last known location area on its SIM. This information stored on the SIM is compared with the location area information broadcast by the local cell. The identities of the two location areas are compared. If they are different, the mobile terminal determines that it has entered a new location area. The mobile terminal then gains access to a radio channel and requests a location area update (LAU). The request includes the now out-of-date LAI and the terminal's current TMSI. If the MSC/VLR is the same for the new and old location areas, the network can immediately authenticate the mobile terminal and note the change of location area. However, if the mobile terminal is moved to a different MSC/VLR, the MSC/VLR addresses a message to the HSS/HLR. The HSS/HLR notes the new location and downloads security parameters to allow the network to authenticate the mobile. It also passes on subscription details of the user to the new VLR and informs the old VLR to delete its records. The new MSC/VLR allocates a new TMSI to the mobile.

A routing area relates to a particular geographical area for communications in the packet-switched domain. Typically, although not necessarily, a routing area is larger than the area of a single cell but is smaller than the area covered by one SGSN. A routing area is typically, although not necessarily, smaller than a location area. There may be many routing areas within one location area. Each cell within the network broadcasts data indicative of its routing area (RAI) in addition to the data mentioned above indicative of the identity of its location area. The mobile terminal uses this received data to determine when it has moved to a new routing area. The terminal stores the last known routing area on its SIM. The information stored on the SIM is compared with the routing area information broadcast by the local cell. The identities of the two to routing areas are compared. If they are different, the mobile terminal determines that it has entered a new routing area. The mobile terminal then gains access to a radio channel and requests a routing area update (RAU). The routing area is updated in the same manner as the location area, as discussed above.

Currently 2G (GSM), 2.5G (GPRS) and 3G (UMTS/UTRA) mobile or cellular telecommunications networks co-exist A development of 3G mobile telecommunications is "evolved" UTRA or E-UTRA, also referred to as SAE (System Architecture Evolution)/LTE (Long Term Evolution).

Elements of an LTE network are shown in FIG. 1. The base stations 20,22 and 24 comprise an eNodeB (evolved Node B) 26. The RRC signalling with the mobile terminal 1 terminates at the eNode B 26, the eNode B comprising the RAN of the LTE network. The eNode B 26 performs the functions of both the Node B and a large part of the RNC of the 3G/UMTS network. The network core 28 of the LTE network includes User Plane Entity (UPE) 30, the HLR/HSS 10 (a common HLR/HSS shared with the network core 12 of the GSM/UMTS network) and also Mobility Management Entity (MME) 32 (also shared with the network core 12 of the GSM TS network). A plurality of UPEs are usually provided, although only one is shown.

Although shown separately in FIG. 1, the UPE 30 and GGSN 19 may be combined to form a single element with one interface to Packet Data Network (PDN) 34 (for example, the Internet). Both the GSM/UMTS and LTE networks communicate with PDN 34.

As discussed above, GSM and UMTS mobile telecommunications networks are divided into paging areas (location areas/routing areas). In the embodiments to be described the LTE network has the equivalent of location/routing areas (herein "tracking areas", TAs). Tracking area updates are performed in a similar manner to RAUs and LAUs.

As mentioned above, a problem with which the embodiments, now to be described in detail, of the system described herein are concerned is the significant radio resources used conventionally in 2G, 3G and the proposed LTE telecommunications network to transmit periodically system parameters on the broadcast channel (BCH). As discussed above, currently nearly all the information to allow a mobile terminal to access a particular cell, and to provide the mobile terminal with knowledge of the radio feature support, is transmitted regularly (periodically) on the BCH. These data are transmitted at a power such that there is a high probability that all the mobile terminals within the geographic area intended to be covered by the cell receive the data.

Conventionally, when a mobile terminal performs cell reselection and selects a new cell, the mobile terminal waits to receive the BCH data for that new cell. After receiving the BCH data, the mobile terminal is then able to identify the RACH channel and configure itself to access the RACH channel to contact the base station for the new cell. If the cell is a cell of a 3G RAN, the base station will be a node B, whereas if the cell is a cell of a LTE RAN, the base station will be an eNode B.

A first embodiment of the system described herein will now be described with reference to FIG. 2.

In contrast to the prior art, not all the system parameters for allowing the mobile terminal 1 to access the cell in which it is located are transmitted on the BCH. Instead, the BCH transmits (only) a system information indicator, which in this embodiment comprises a system information minimum set. The system information minimum set is transmitted by the eNode B 26 of the base station 20 that serves the cell in which the mobile terminal 1 is located, in message A of FIG. 2. This system information minimum set only includes a sub-set of the information that is conventionally transmitted on the BCH. The system information minimum set includes the identifier of the network (n), PLMN ID, and the tracking area, TA, in which the cell is located, and information to find the RACH and to configure access to the RACH.

After receiving the system information minimum set in message A, the mobile terminal 1 is able to access the RACH in message B to communicate with the eNode B 26.

The eNode B 26 then grants the mobile terminal 1 radio resources by transmitting message C.

The mobile terminal 1 then attaches to the network or performs a TA update, as indicated by message D. Message D is transmitted to the MME 32 via the eNode B 26.

The MME 32 stores a system information container, which contains the system parameters for the mobile terminal 1 for the telecommunications system (n) as a whole or the TA or cell in which the cell is located. The system information container is transmitted to the mobile terminal 1 in message E in the (first) downlink non-access stratum (NAS) message (which includes, for example, authentication request, attach accept, TA update accept message etc.). After receipt of message E, the mobile terminal 1 has the system information required to access the cell and provide it with knowledge of the radio feature support provided by that cell. That is, after receipt of message E the mobile terminal 1 has data which are equivalent to that provided solely on the BCH in the prior art. However, in the embodiment the system parameters transmitted in the system information container may be specific to a particular mobile terminal.

Figure 2:
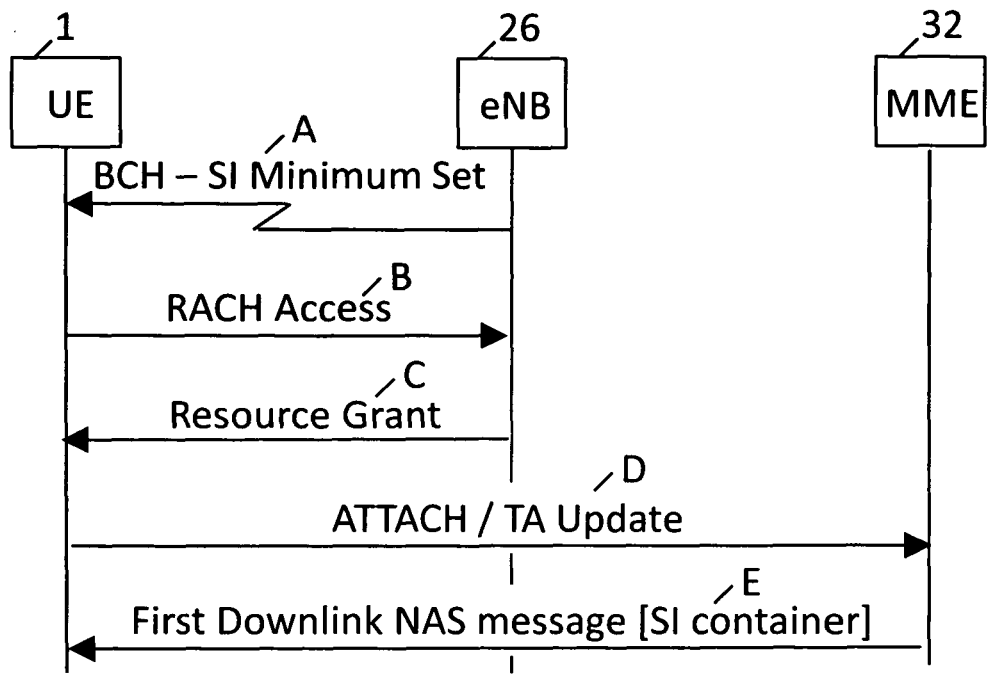
FIG. 2 shows the messaging sequence of a first embodiment of the system described herein, where the system includes an LTE RAN and the system information indicator is a sub-set of the full system information.
Figure 3:
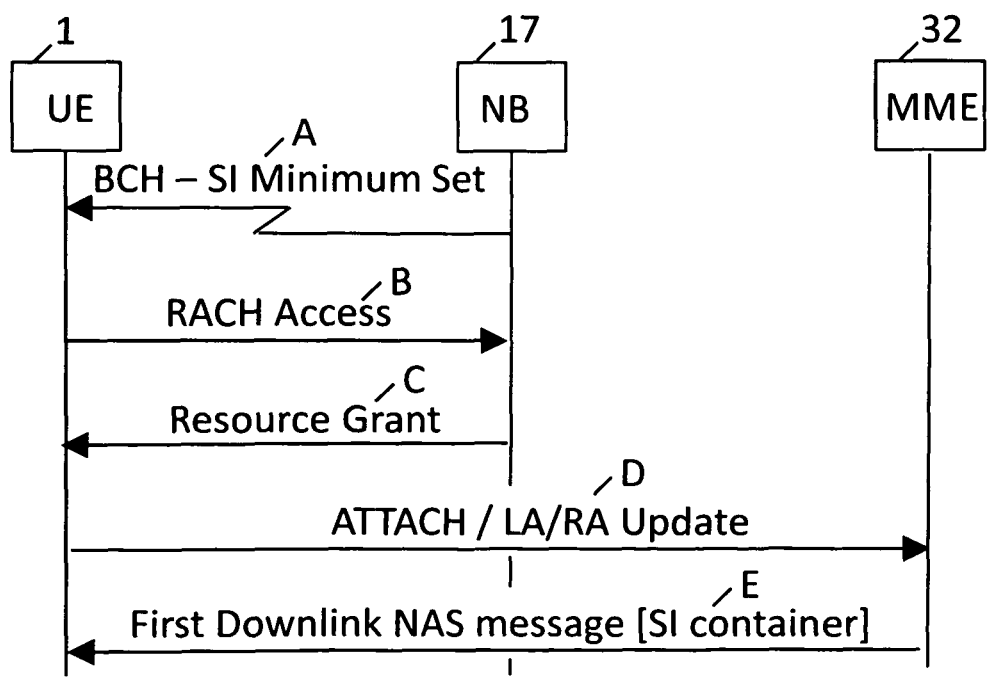
FIG. 3 shows the messaging sequence of a second embodiment, similar to the first embodiment, but where the system includes a 3G RAN.

FIG. 3 shows a second embodiment of the system described herein, similar to the first embodiment of FIG. 2, for the mobile terminal 1 which reselects a 3G cell for which radio coverage is provided by node B 17 forming part of the base station 7 providing radio coverage for the reselected cell. Messages A,B,C,D and E are transmitted between the mobile terminal 1, node B 17 and MME 32 in a similar manner to which the messages are transmitted between the mobile terminal 1, eNode B 26 and MME 32 in the first embodiment and, for the sake of brevity, will not be described again. However, the TA update optionally performed in step D will be a RA or LA update.

In the third and fourth embodiments of the system described herein, the system information is made available to the mobile terminal in a slightly different manner.

Figure 4:
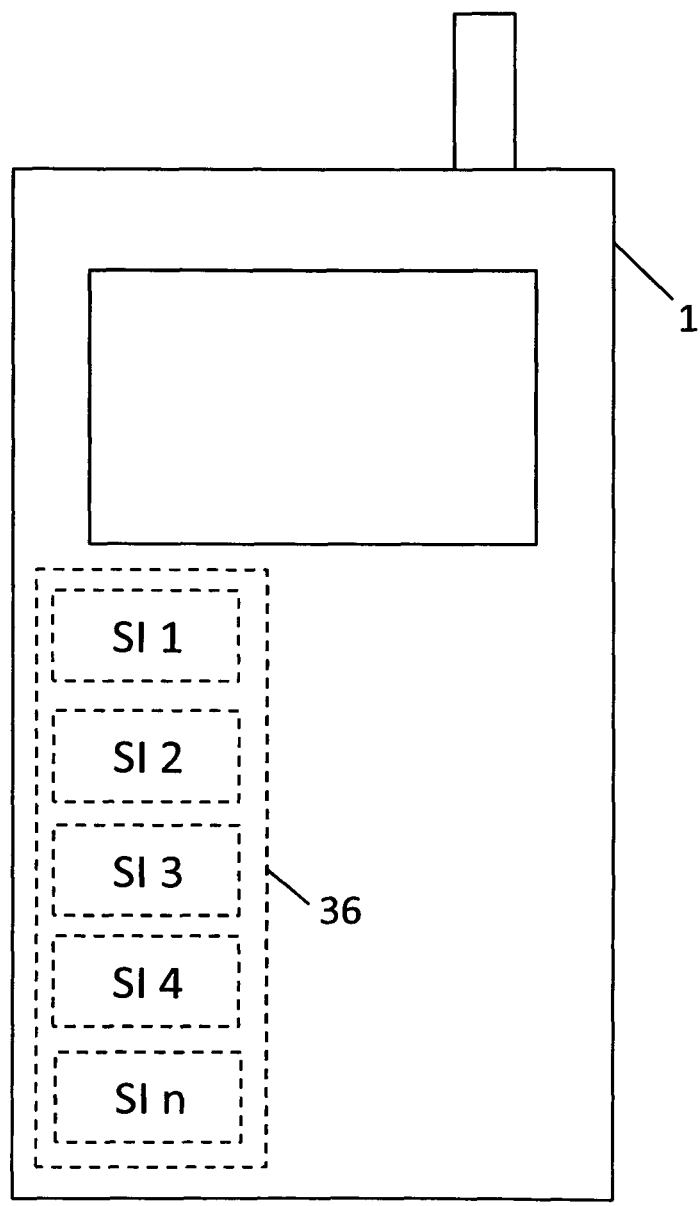
FIG. 4 shows a mobile terminal including a system information profile store, in accordance with a third and fourth embodiment.

In the third embodiment the mobile terminal 1, shown in more detail in FIG. 4, includes a system information profiles store 36 which stores a plurality of system information profiles, SI 1, SI 2, SI 3, SI 4, . . . , SI n. The value (1 . . . n) following "SI" is the system information profile index number of each of the system information profiles in the store 36. The system information profiles may be stored on the mobile terminal 1 during its manufacture, or may be uploaded to the mobile terminal 1 by over the air (OTA) transmission by the system (n). System information profiles stored on the mobile terminal 1 (whether by being pre-stored when the mobile terminal is manufactured, or uploaded to the mobile terminal by the system (n)), can be reconfigured by the system operator by OTA transmissions—that is, elements of each system information profile can be varied, without necessarily transmitting the whole systems information profile. For example, any changes to the system information profiles stored in the mobile terminal 1 may be transmitted by the MME 32 when the mobile terminal completes a TA update procedure (or at any other time). When the mobile terminal enters a new TA, and therefore performs a TA update, the mobile terminal will be served by a different set of cells (the cells of the new TA). The system information profiles in the mobile terminal are advantageously system information profiles appropriate to the cells of the new tracking area.

Figure 5:
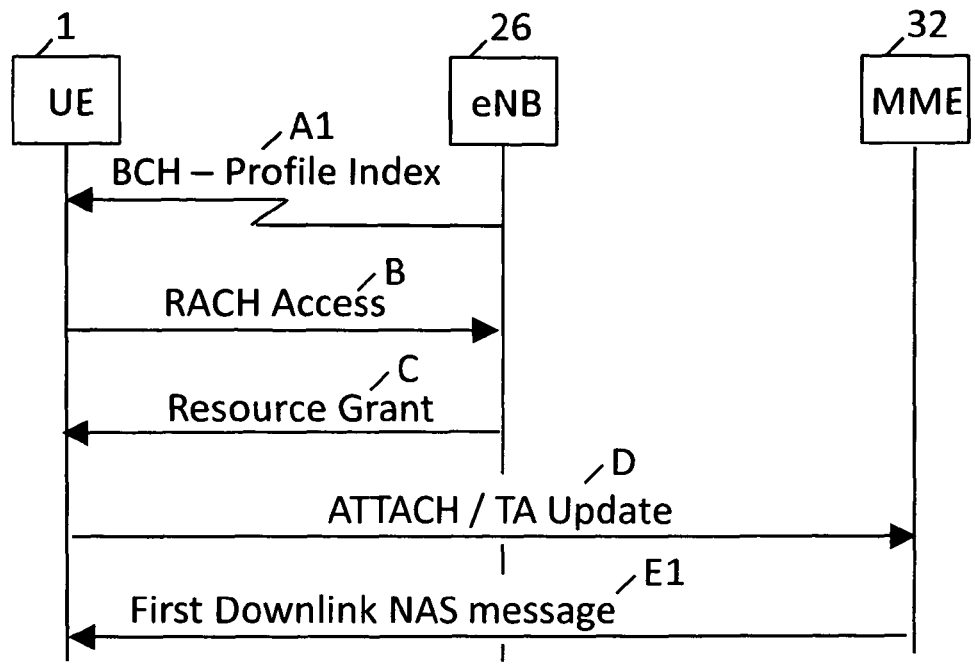
FIG. 5 shows the messaging sequence of the third embodiment, where the system includes an LTE RAN and the system information indicator includes a profile index indication for referencing the profile store.

Referring now to FIG. 5, in the third embodiment, the BCH transmits a system information indicator as in the first and second embodiments. However, in the third embodiment, the system information indicator is a system information profile index value (1 . . . n), and is transmitted from the eNode B 26 to the mobile terminal 1 in message A1. On receipt of message A1, the mobile terminal 1 determines the system information profile index value contained in the message and uses this to retrieve from the store 36 the relevant system information profile that corresponds to that system information profile index value transmitted in message A1. The mobile terminal 1 is now provided with the system information necessary to allow it to access the cell and to provide it with the knowledge of the radio features supported by the cell. That is, the mobile terminal 1 now has the same information that was conventionally transmitted in the BCH in the prior art. However, in the embodiment the system information may be specific to a particular mobile terminal.

The mobile terminal 1, with the relevant system information now made available to it, is able to find the RACH and to configure itself to access the RACH and communicate with eNode B 26 in message B.

eNode B 26, after receiving message B, then grants the mobile terminal 1 resources in message C. Mobile terminal 1 is then able to perform with MME 32 an attach request or TA update in message D.

The first downlink NAS message E1 transmitted from the MME 32 to the mobile terminal 1 via eNode B 26 may include, for example, an authentication request, attach accept, TA update accept etc. In contrast to the first and second embodiments, the first downlink NAS message E1 may not include the system information container, as the relevant system information is retrieved from the store 36 of the mobile terminal 1. However, system information may be provided in the first downlink NAS message E1, in the system information container, in a similar manner to the first and second embodiments, if the MME 32 wishes to change the system information. When such changed system information is received in the SI container by the mobile terminal 1, this can be used to update the system information used by the mobile terminal 1 for communicating with the present cell and can also be used to update the relevant system information profile stored in the store 36 of the mobile terminal 1 for future use.

Figure 6:
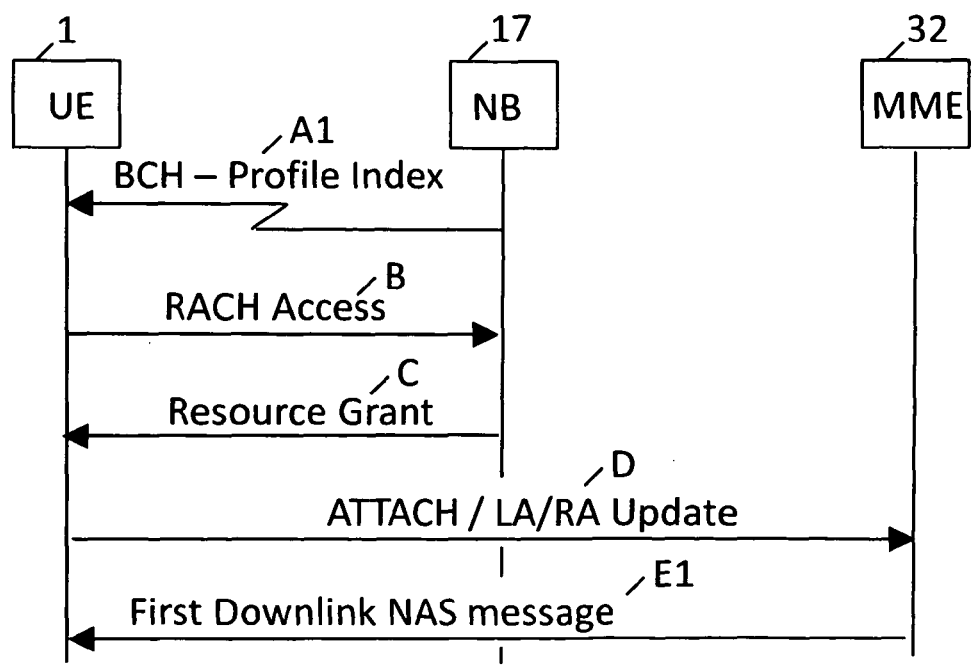
FIG. 6 shows the messaging sequence of a fourth embodiment, similar to the third embodiment, but where the system includes a 2G RAN.

The third embodiment, described in FIG. 5 describes the process for transmitting system information in an LTE cell. The fourth embodiment, now to be briefly described with reference to FIG. 6, describes a similar process when the system information is for a cell of a 3G RAN. However, the optional TA update performed in step D will be a RA or LA update.

In the fourth embodiment, the system information profile index (1 . . . n) is transmitted on the BCH from the node B 17 to the mobile terminal 1 in message A1, in a similar manner to the third embodiment (FIG. 5). Messages B,C,D and E1 are transmitted between the mobile terminal 1, node B 17 and MME 32 in a similar manner to which the corresponding messages are transmitted between the mobile terminal 1, eNode B 26 and MME 32 in the third embodiment, and will not be described further for the sake of brevity.

In the first and second embodiments described with reference to FIGS. 2 and 3, respectively, the MME 32 provides the system information in SI container in message E, which is then transmitted to the mobile terminal 1 via the eNode B 26 (for a LTE RAT) and via the RNC 13 and Node B 17 (for a 3G RAT). As an alternative, the system information in the SI container in step E could be provided by the relevant RAN — the eNode B for an LTE RAT and the RNC 13/Node B 17 for the 3G RAT rather than the MME 32.

In the embodiments it is indicated that the system information may conveniently be transmitted when a paging area update (location area update/routing area update/tracking area update) is performed. However, the system information may be updated more or less frequently than this.

According to the embodiments, the system information may be varied for each cell of the telecommunications system. That is, different cells may provide the mobile terminals registered therewith with different system information. Further, the system information provided to each mobile terminal within a particular cell may be different, so that the system information can be tailored to a particular terminal in a particular cell. This should be contrasted with the uniform system information provided generally to all mobile terminals in all cells of a particular RAT.

The system information may be used to control for each mobile terminal which frequency band the mobile terminal selects, and also to control, vary or adapt frequency reselection performed by the mobile terminal—to select either the 900 or 1800 MHz frequency bands for a 2G/3G RAT. System information may also be used to push a particular mobile terminal or set of mobile terminals from one RAT to another RAT—for example, from a 2G RAT to a 3G RAT.

Further, the system information may cause selected mobile terminals using a particular cell to subsequently select a different cell. Such system information may be provided to the mobile terminal or a selected group of mobile terminals registered with a particular cell when it is determined by the system n that the current cell is congested.

Additionally, the system information may be varied according to the node B/eNode B type that serves the cell. For example, some node B's/eNode B's may have a smaller range than others—that is, the area covered by a particular Node B/eNode B is different from that covered by another Node B/eNode B. The system information can be varied, selected or adapted to be optimised for the geographical area covered by a particular Node B/eNode B.

The embodiments could be optimised such that:

a) The mobile terminal always has a default configuration when (RACH) accessing the cell for the Attach or Tracking Area update procedures. The fact that the mobile terminal is accessing for one these procedures is indicated in the RACH message.

b) After signalling that the mobile terminal is completing one of these procedures in the RACH, the mobile terminal can be provided some configuration information in a dedicated manner by the eNodeB in the Resource Grant message. This information could be optional or minimised for the TA update procedure.

c) Some combination of both (a) and (b).

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A method of providing a terminal with system information which enables the terminal to access a particular cell of a plurality of cells of a cellular telecommunications system, comprising:

transmitting from the cellular telecommunications system to said terminal, a system information indicator that makes available, to the terminal, system information to provide access by the terminal to the particular cell of the cellular telecommunications system, wherein the system information indicator makes the system information available from a non-broadcast source, wherein the system information indicator directs the terminal to retrieve the system information from a store, the store being the non-broadcast source, and use the system information to access the particular cell of the cellular telecommunications system, wherein the system information retrieved by the terminal from the store to provide access to the particular cell is specific to the terminal and enables access to the particular cell for a package of services which the terminal is authorized to use, wherein the system information of any of the plurality of cells is stored in the store independently of whether the terminal has previously accessed any of the plurality of cells, and wherein new system information for a new cell of the plurality of cells, that has been previously unaccessed by the terminal, is thereby available to the terminal from the store.

2. The method of claim 1, wherein the system information indicator is broadcast by the particular cell on a Broadcast Control Channel.

3. The method of claim 1, wherein the store stores a plurality of respective system information sets, and said system information indicator directs the terminal to retrieve and use a selected one of the system information sets.

4. The method of claim 1, wherein the system information indicator provides the portion of the system information in order to enable limited access of said terminal to the particular cell of the cellular telecommunications system, which limited access includes enabling the terminal to request and receive a downlink message, the downlink message making a remainder of the system information available to the terminal.

5. The method of claim 4, wherein the portion of the system information provided in the system information indicator enables the terminal to access the Random Access Channel to request and obtain grant of resources from the cellular telecommunications system to receive the remainder of the system information from the non-broadcast source.

6. The method of claim 4, wherein the system information indicator further enables the terminal to attach to the cellular telecommunications system or to perform a paging area update.

7. The method of claim 5, wherein the portion of the system information provided in the system information indicator includes an indication of the cellular telecommunications system and an indication of the paging area in which the particular cell is situated.

8. The method of claim 4, wherein the portion of the system information provided in the system information indicator enables the terminal to retrieve a Non Access Stratum message, including the remainder of said system information.

9. The method of claim 8, wherein said non-access stratum message also includes at least one of: an authentication request, an attach request or a paging area update accept portion.

10. The method of claim 4, wherein the remainder of the system information is at least one of:
   i) previously stored by the cellular telecommunications system; or
   ii) previously configured by the cellular telecommunications system.

11. The method of claim 10, wherein the cellular telecommunications system is a Long Term Evolution system and the remainder of the system information is previously transmitted by a Mobility Management Entity of the Long Term Evolution system.

12. A telecommunications system for providing a terminal with system information which enables the terminal to access a particular cell of a plurality of cells of a cellular telecommunications system, comprising:
   a transmitter that transmits from the cellular telecommunications system to said terminal, a system information indicator for making available to the terminal system information to provide access by the terminal to the particular cell of the cellular telecommunications system, wherein the system information indicator makes the system information available from a non-broadcast source, wherein the system information indicator directs the terminal to retrieve the system information from a store, the store being the non-broadcast source, and use the system information to access the particular cell of the cellular telecommunications system, wherein the system information retrieved by the terminal from the store to provide access to the particular cell is specific to the terminal and enables access to the particular cell for a package of services which the terminal is authorized to use, wherein the system information of any of the plurality of cells is stored in the store independently of whether the terminal has previously accessed any of the plurality of cells, and wherein new system information for a new cell of the plurality of cells, that has been previously unaccessed by the terminal, is thereby available to the terminal from the store.

13. The system of claim 12, wherein the transmitter is operable to broadcast the system information indicator by the cell on the Broadcast Control Channel.

14. The system of claim 12, wherein the store stores a plurality of respective system information sets, and said system information indicator directs the terminal to retrieve and use a selected one of the system information sets.

15. The system of claim 12, wherein the system information indicator provides the portion of the system information in order to enable limited access of said terminal to the particular cell of the cellular telecommunications system, which limited access includes enabling the terminal to request and receive a downlink message, the downlink message making a remainder of the system information available to the terminal.

16. The system of claim 15, wherein the portion of the system information provided in the system information indicator is for enabling the terminal to access the Random Access Channel to request and obtain grant of resources from the cellular telecommunications system to receive the remainder of the system information from the non-broadcast source.

17. The system of claim 15, wherein the system information indicator further enables the terminal to attach to the cellular telecommunications system or to perform a paging area update.

18. The system of claim 16, wherein the portion of the system information provided in the system information indicator includes an indication of the cellular telecommunications system and an indication of the paging area in which the particular cell is situated.

19. The system of claim 15, wherein the portion of the system information provided in the system information indicator enables the terminal to retrieve a Non Access Stratum message, including said system information.

20. The system of claim 19, wherein said non-access stratum message also includes at least one of: an authentication request, an attach request and a paging area update accept portion.

21. The system of claim 15, wherein the remainder of the system information is at least one of:
   i) previously stored by the cellular telecommunications system; or
   ii) previously configured by the cellular telecommunications system.

22. The system of claim 21, wherein the cellular telecommunications system is a Long Term Evolution system and the system information is transmitted by a Mobility Management Entity of the Long Term Evolution system.

23. The system of claim 12, wherein the cellular telecommunications system includes the terminal.

24. A method of transferring data between a telecommunications network and a mobile terminal, comprising:
sending a first message from the network to the mobile terminal when the terminal enters a new tracking area; and
receiving at the mobile terminal a further message from a non-broadcast source, said further message containing system information about the network which is essential in order for the mobile terminal to use a network service, wherein the first message directs the terminal to retrieve the system information from a store, the store being the non-broadcast source, and use the system information to access a particular cell of the network, wherein the system information retrieved by the terminal from the store to provide access to the particular cell is specific to the terminal and enables access to the particular cell for a package of services which the terminal is authorized to use, wherein the system information of any of a plurality of cells is stored in the store independently of whether the terminal has previously accessed any of the plurality of cells, and wherein new system information for a new cell of the plurality of cells, that has been previously unaccessed by the terminal, is thereby available to the terminal from the store.

25. The method of claim 24, wherein the first message contains at least one of: information about the new tracking area and an index.

26. The method of claim 24, wherein contents of the further message are operator configurable.

27. The method of claim 24, wherein the further message contains only a sub-set of information about the new tracking area.

28. The method claimed in claim 24, wherein said network is at least one of: a cellular telecommunications network, a GSM network, and a UMTS network.

29. The method according to claim 24, wherein the further message is sent when the mobile terminal accesses the network.

30. The method according to claim 24, wherein the first message contains information allowing the mobile terminal to access the network.

31. A system, comprising:
a telecommunications network and a mobile terminal, wherein said telecommunications network includes:
a sending device that sends a first message to the mobile terminal when said mobile device enters a new tracking area;
and wherein said mobile terminal includes:
a receiving device that receives further messages from a non-broadcast source, said further messages containing system information about the network which is essential in order for the mobile terminal to use a network service, wherein the first message directs the terminal to retrieve the system information from a store, the store being the non-broadcast source, and use the system information to access a particular cell of the network, wherein the system information retrieved by the terminal from the store to provide access to the particular cell is specific to the terminal and enables access to the particular cell for a package of services which the terminal is authorized to use, wherein the system information of any of a plurality of cells is stored in the store independently of whether the terminal has previously accessed any of the plurality of cells, and wherein new system information for a new cell of the plurality of cells, that has been previously unaccessed by the terminal, is thereby available to the terminal from the store.

32. The method of claim 1, wherein the system information indicator is transmitted to the terminal by being broadcast to the terminal, wherein the system information indicator enables limited access by the terminal to the cellular telecommunications system, the limited access provided by the system information indicator enabling the terminal to request and receive the system information from the non-broadcast source, wherein the system information enables greater access by the terminal to the cellular telecommunications system, the greater access enabled by the system information being more access than the limited access enabled by the system information indicator.

33. The system of claim 12, wherein the system information indicator is transmitted to the terminal by being broadcast to the terminal, wherein the system information indicator enables limited access by the terminal to the cellular telecommunications system, the limited access provided by the system information indicator enabling the terminal to request and receive the system information from the non-broadcast source, wherein the system information enables greater access by the terminal to the cellular telecommunications system, the greater access enabled by the system information being more access than the limited access enabled by the system information indicator.

* * * * *

UNITED STATES PATENT AND TRADEMARK OFFICE
CERTIFICATE OF CORRECTION

| | | |
|---|---|---|
| PATENT NO. | : 8,787,233 B2 | Page 1 of 1 |
| APPLICATION NO. | : 12/225969 | |
| DATED | : July 22, 2014 | |
| INVENTOR(S) | : David Andrew Fox and Timothy Frost | |

It is certified that error appears in the above-identified patent and that said Letters Patent is hereby corrected as shown below:

The TITLE page should read:

(75) Inventors: David Andrew Fox, Reading (GB) and Timothy Frost, Madrid (ES)

Signed and Sealed this
Tenth Day of March, 2015

Michelle K. Lee
*Deputy Director of the United States Patent and Trademark Office*